(12) United States Patent
Woollams

(10) Patent No.: US 6,386,339 B1
(45) Date of Patent: May 14, 2002

(54) AUTOMATIC ADJUSTER FOR SPRING APPLIED MECHANISMS

(76) Inventor: John Woollams, 29 Queen Street, Lorn, NSW 2320 (AU)

( * ) Notice: Subject to any disclaimer, the term of this patent is extended or adjusted under 35 U.S.C. 154(b) by 0 days.

(21) Appl. No.: 09/355,029

(22) PCT Filed: Jan. 27, 1998

(86) PCT No.: PCT/AU98/00043

§ 371 Date: Oct. 28, 1999

§ 102(e) Date: Oct. 28, 1999

(87) PCT Pub. No.: WO98/32989

PCT Pub. Date: Jul. 30, 1998

(51) Int. Cl.[7] .............................................. F16D 65/56
(52) U.S. Cl. .................. 188/203; 188/196 V; 188/170; 92/130 A
(58) Field of Search ................... 188/71.8, 170, 188/171, 196 V, 202, 203, 166, 167, 168; 92/130 A

(56) References Cited

U.S. PATENT DOCUMENTS

| | | | | |
|---|---|---|---|---|
| 3,575,087 A | * | 4/1971 | Sherwood | 92/23 |
| 3,576,152 A | * | 4/1971 | Chevreux | 92/65 |
| 3,701,398 A | * | 10/1972 | Martins | 188/71.8 |
| 3,995,722 A | * | 12/1976 | Jones et al. | 188/71.9 |
| 4,014,414 A | * | 3/1977 | Yamamoto | 188/170 |
| 4,226,307 A | | 10/1980 | Dorot | |
| 4,364,305 A | * | 12/1982 | Dalibout et al. | 92/63 |
| 4,478,319 A | * | 10/1984 | Casalone et al. | 188/170 |
| 4,493,246 A | * | 1/1985 | Dalibout | 92/13.8 |
| 4,595,083 A | * | 6/1986 | Mackenzie et al. | 188/196 C |
| 4,649,804 A | * | 3/1987 | Oberlander | 92/63 |
| 4,796,513 A | * | 1/1989 | Hata et al. | 92/5 R |
| 4,867,283 A | * | 9/1989 | Dill | 188/196 D |
| 5,076,401 A | * | 12/1991 | Ta et al. | 188/71.9 |
| 5,154,262 A | * | 10/1992 | Berwanger | 188/196 R |
| 5,313,745 A | * | 5/1994 | Cantwell | 29/260 |
| 5,937,974 A | * | 8/1999 | Cathcart | 188/203 |

FOREIGN PATENT DOCUMENTS

| | | |
|---|---|---|
| DE | 1 675 155 | 1/1968 |
| JP | 405180252 | * 7/1993 |

* cited by examiner

Primary Examiner—Eric Culbreth
Assistant Examiner—David Divine
(74) Attorney, Agent, or Firm—Larson & Taylor, PLC

(57) ABSTRACT

In a spring applied mechanism such as a fail-safe disc brake having a disk and pads, there is provided an automatic adjuster to maintain even travel and pressure to the brake pads from the spring pack regardless of pad wear. The adjuster has a piston operable by hydraulic pressure to draw a pushrod back from the brake pad and a lock actuator in the form of a collet operable between the piston and the pushrod to provide positive movement of the pushrod with the piston in the direction of force application from the spring pack while allowing relative movement between the piston and the pushrod during movement of the piston in the opposite direction.

6 Claims, 8 Drawing Sheets

AUTOMATIC ADJUSTER FOR SPRING APPLIED MECHANISMS

FIELD OF THE INVENTION

This invention relates to an automatic adjuster for spring applied mechanisms and has been devised particularly though not solely for use with spring applied fail-safe brakes.

BACKGROUND OF THE INVENTION

There are many different brake and clutch mechanisms used in many different applications, such as the disc brakes used in motor vehicles and various industrial applications such as conveyor belts where it is necessary to automatically adjust the wear or lost travel in the piston mechanism. Such automatic adjusting mechanisms are readily available in use as the problem has been easily solved when the brake piston travel is in the same direction in which the adjustment needs to occur. In this configuration it is a simple matter to extend the adjusting mechanism to compensate for lost travel, and many such mechanisms are commonly available.

By way of contrast, so-called "fail-safe" disc brakes use spring energy to supply the force to apply the brake. The brake is released by hydraulic, pneumatic or direct mechanical actuators. In fail-safe brakes of this type, if there is any failure in the release mechanism, the brake is automatically applied by the spring force.

One of the major difficulties in designing "fail-safe" braking systems is the fact that the spring force is not linear in relation to travel. This requires constant adjustment to compensate for wear (of the brake pads) and keep the spring travel to a minimum. Alternatively some designs utilise a spring which is much stronger than is required in optimum conditions, so that the spring will supply the desired braking force even when the brake pads have been worn to their maximum extent.

The difficulty in providing an automatic adjuster for fail-safe brakes is that the direction of travel of the piston to operate the brake is in the opposite direction to that required for the automatic adjustment of lost travel. Because of this difficulty, at present all adjustments for lost travel are carried out by manual adjustment or by external ratchet-type adjusters. This is of course undesirable as it requires frequent attention to the braking mechanisms with the possibility that the adjustment could be overlooked and the fail-safe braking systems move outside the normal tolerances for efficient operation. Furthermore the necessity for frequent manual adjustment is time consuming and therefore expensive.

SUMMARY OF THE INVENTION

The present invention therefore provides an automatic adjuster for spring applied mechanisms of the type wherein travel of an actuating member under spring pressure may vary depending upon component wear, the adjuster incorporating a piston movable by spring pressure in one direction to apply a desired force and by other actuating means in the opposite direction to remove the desired force, a pushrod movable by and with the piston, and a lock actuator operable between the piston and the pushrod arranged to provide positive movement of the pushrod with the piston in the direction of force application from spring pressure while allowing relative movement between the piston and the pushrod over controlled limits during movement of the piston in the opposite direction.

Preferably the lock actuator comprises a collet operable between the piston and the pushrod.

Alternatively the lock actuator comprises an equivalent mechanism such as an offset collar and rod mechanism, self locking screw thread, or any other form of one-way locking device.

Preferably a further lock actuator is provided operable between the pushrod and a housing for the piston, arranged to control movement of the pushrod between predetermined limits during retraction of the pushrod.

Preferably the further lock actuator comprises a collet operable between the pushrod and the piston housing.

Alternatively the lock actuator comprises an equivalent mechanism such as an offset collar and rod mechanism, self-locking screw thread, or any other form of one-way locking device. Other methods of clamping having predetermined torque values, such as a compressed O-ring or various shrink rings can also be used.

Preferably the adjuster incorporates an extension of the piston operable to disengage said further lock actuator and allow the pushrod to be retracted to its original (unadjusted) position.

Preferably the adjuster incorporates a release cup operable from outside the adjuster to release the lock actuator from forming a clamp between the piston and the pushrod.

Preferably the actuating member is arranged to actuate the clamping motion of a pair of disc pads in a disc brake.

Preferably the release cup is operable to enable retraction of the pushrod for pad replacement in the disc brake.

BRIEF DESCRIPTION OF THE DRAWINGS

Notwithstanding any other forms that may fall within its scope, one preferred form of the invention will now be described by way of example only with reference to the accompanying drawings, in which.

DETAILED DESCRIPTION OF PREFERRED EMBODIMENTS OF THE INVENTION

Figure 1:
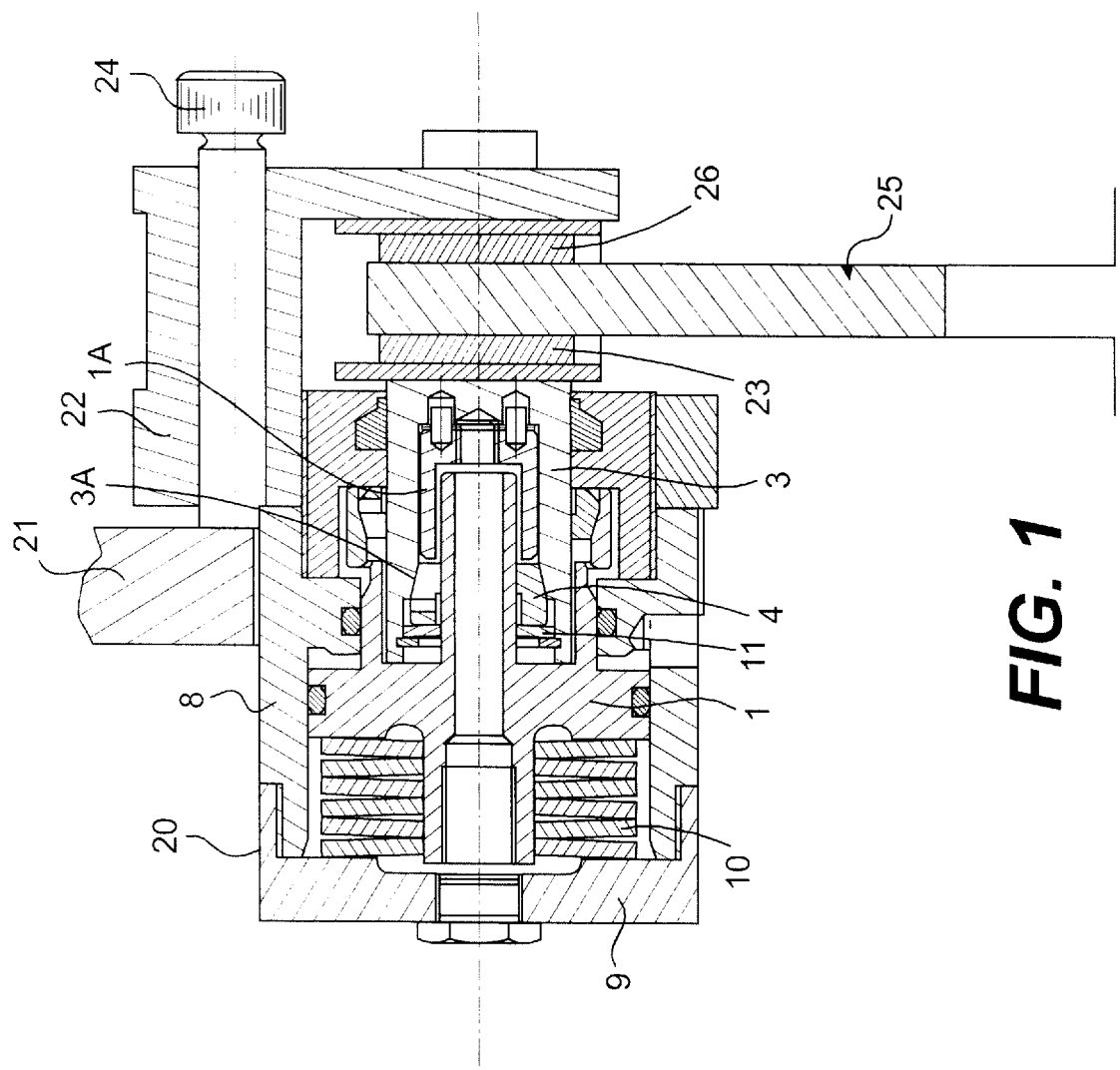
FIG. 1 is a cross-sectional elevation of an automatic adjuster for a spring applied fail-safe disc brake according to the invention.

In the preferred form of the invention a calliper-type disc brake unit is provided consisting of an automatic adjuster actuator shown generally at 20 (FIG. 1) which is supported in a calliper mount 21 from which depends a brake calliper mounting bolt 24. A calliper body 22 is provided which is able to move axially on the brake calliper mounting bolt 24 and brake pads 23 and 26 are provided arranged to clamp either side of a brake disc 25.

The brake pad 23 is forced against the left hand face (as seen in FIG. 1) of the brake disc 25 by force applied through pushrod 3 (as will be described further below) causing a reaction through the brake calliper body 22. This reaction force causes the calliper body 22 to move on the mounting bolts 24 until the brake pad 26 contacts the right hand face of the brake disc 25. The forces are then equally applied to the disc 25 through both pads 23 and 26. This "floating calliper" brake disc mechanism is well known and understood in the prior art.

The automatic adjuster actuator 20 is formed from a cylindrical piston housing 8 onto which is screwed an end cap 9. Piston 1 is slidably contained within piston housing 8 and biased from left to right as seen in FIG. 1 by spring pack 10 acting between the end cap 9 and the piston 1. Piston 1 is provided with a cylindrical extension 1A protruding into the hollow core of a cylindrical pushrod 3 which is adapted to support, bear against and actuate brake pad 23 as previously described.

The cylindrical extension 1A of piston 1 causes movement of pushrod 3 by way of an actuation collet 4 having wedge-shaped collet members as can be clearly seen in FIG. 1. The inner cylindrical surface of pushrod 3 has a conical portion 3A which the wedge-shaped outer surfaces of the actuation collet members 4 bear against causing the actuation movement of the piston 1 and its cylindrical extension 1A, under actuating force from the spring pack 10, to be transmitted to the pushrod 3.

In this manner the brake is actuated by force from the spring pack 10 causing the piston to move from left to right as seen in FIG. 1 which movement is transmitted through the actuating collet 4 to the pushrod 3 and the brake pad 23.

Figure 2:
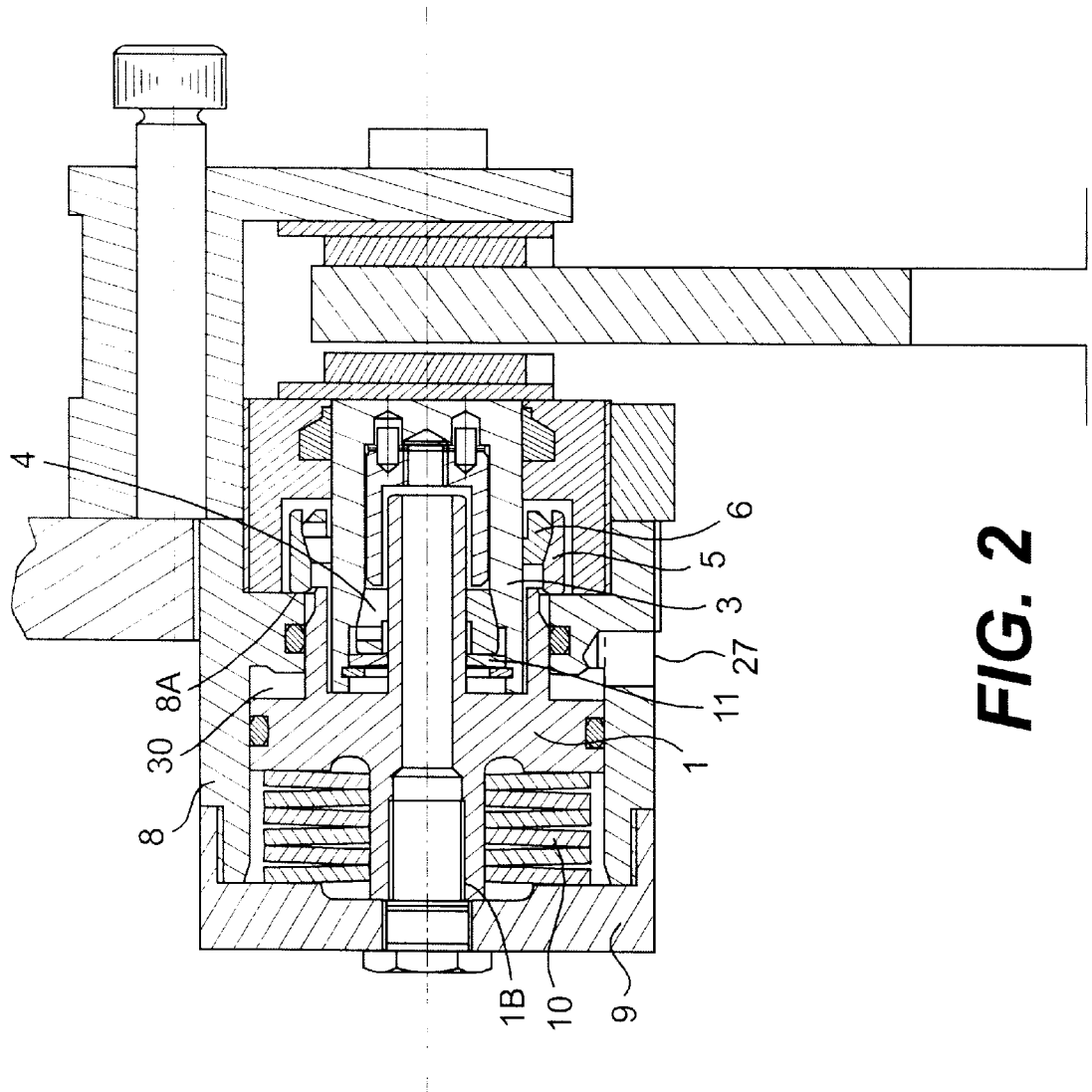
FIG. 2 is a similar drawing to FIG. 1 showing the brake fully released.

The release of the brake will now be described with reference to FIG. 2. Hydraulic pressure is applied through port 27 into cylindrical space 30 causing piston 1 to move from right to left as seen in FIG. 2 and compress the spring pack 10 as shown. The travel of piston 1 is stopped by contact between extended part 1B of piston 1 and the end cap 9.

The outer cylindrical surface of the pushrod 3 is provided with a locating collet 6 which is clamped to the pushrod 3 and in turn engages a locating collar 5. Movement of the piston 1 and its cylindrical extension 1A from right to left causes the pushrod 3 to also move from right to left due to the clamp of the actuating collet 4 causing the locating collet 6 to pull the locating collar 5 back against shoulder 8A in piston housing 8. The pushrod 3 is fully retracted at this point.

Figure 3:
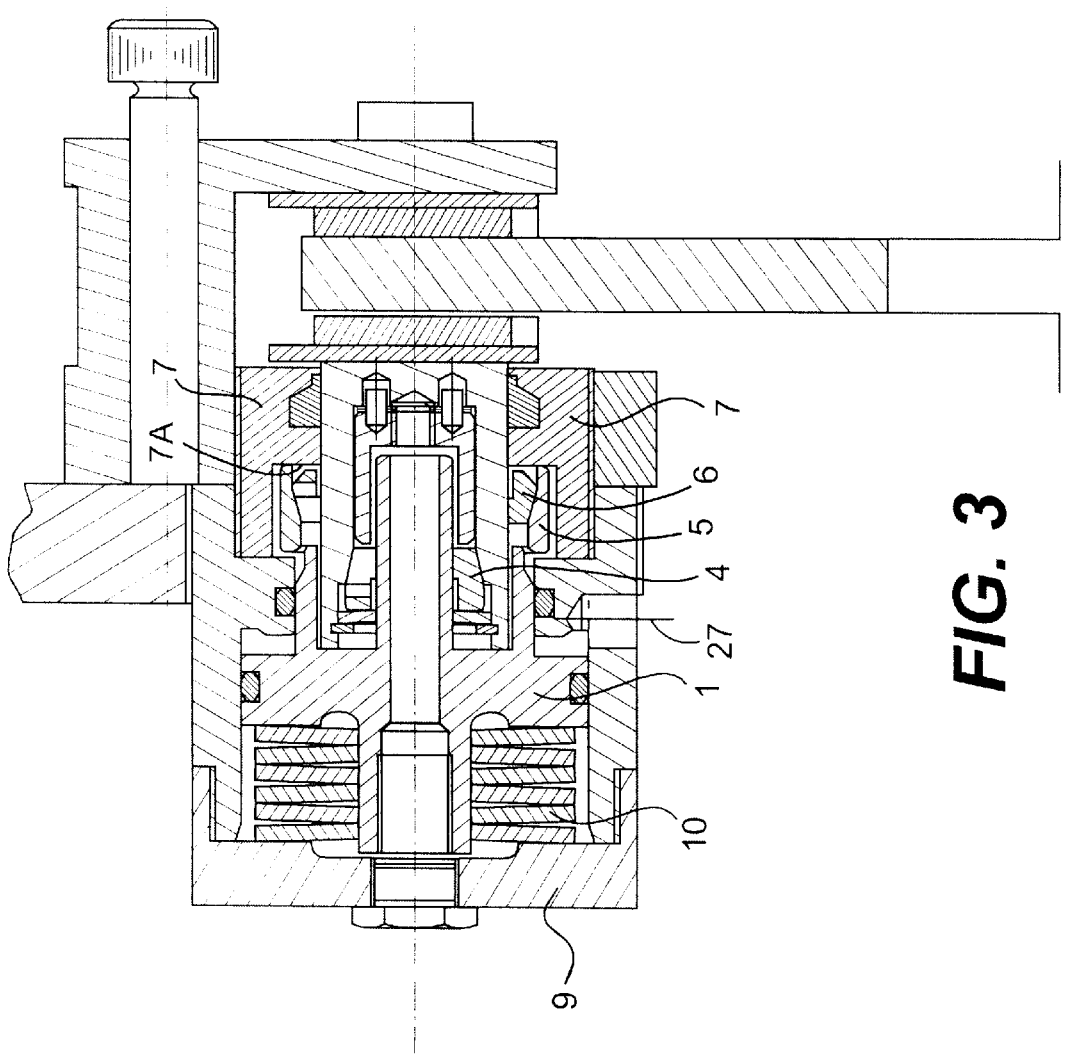
FIG. 3 is a similar drawing to FIG. 1 showing the brake partially applied.

Turning now to FIG. 3, the brake is partially applied by releasing pressure from port 27 allowing the spring pack 10 to move the piston 1 from left to right along with the locating collar 5 which is held in position relative to piston 1 by the locating collet 6 between the locating collar 5 and pushrod 3, and by the clamp of the actuating collet 4 between the pushrod 3 and the cylindrical extension A1 of piston 1. The locating collar 5 continues to move until it contacts shoulder 7A in pushrod housing 7 which is screwed into and forms part of piston housing 8. When locating collar 5 contacts shoulder 7A in the pushrod housing 7 its progress is halted and at this point the locating collet 6 is moved away from the locating collar 5 by the clamp force between the locating collet 6 and the pushrod 3.

Figure 4:
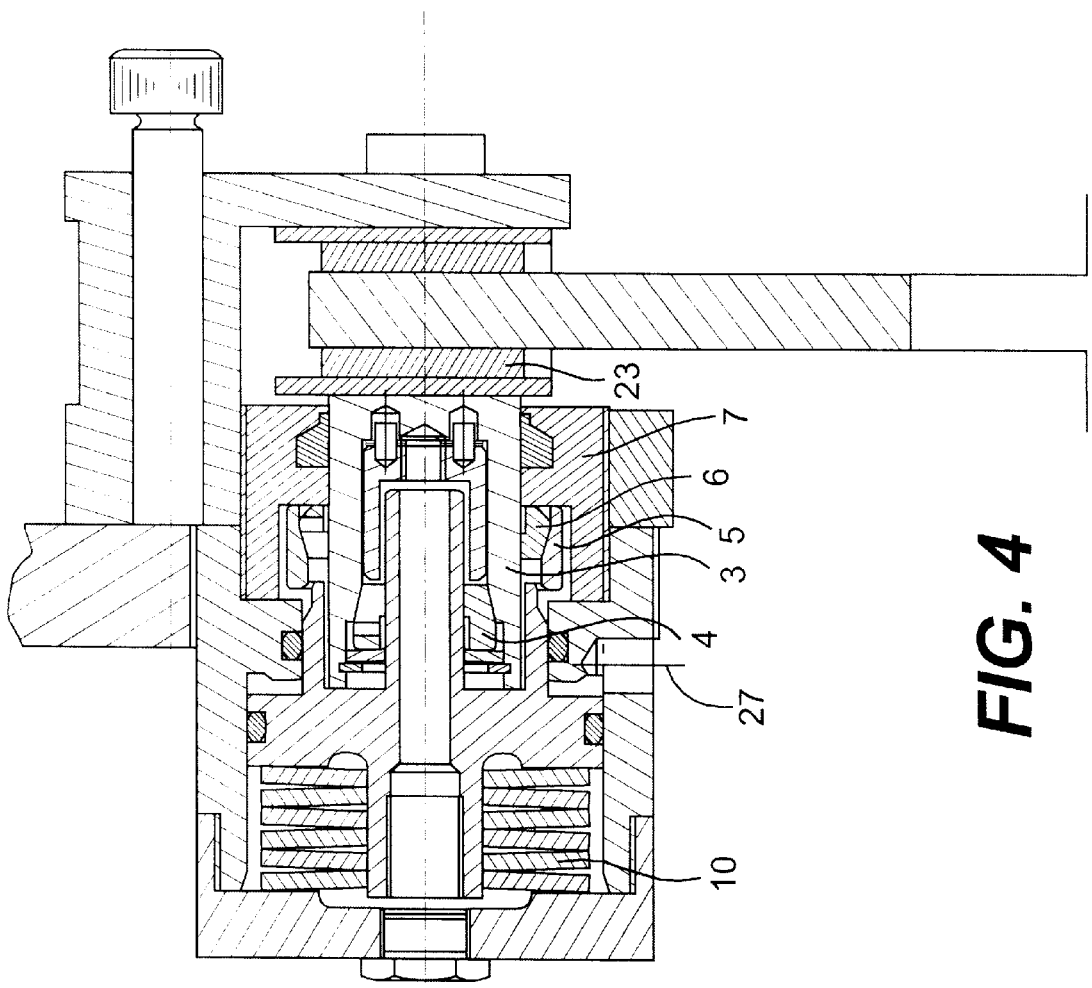
FIG. 4 is a similar drawing to FIG. 1 showing the brake fully applied.

To apply the brake, pressure is completely released from port 27 and the full force of the spring pack 10 is applied to the pad 23 via the pushrod 3 and the actuation collet 4 as can be seen in FIG. 4. The locating collet 6 is prevented from moving any further from a predetermined stroke distance by contact between the locating collet 6 and shoulder 7A of the pushrod housing 7. Any travel of the pushrod 3 greater than the predetermined stroke distance causes the pushrod 3 to move through the locating collet 6 adjusting the relative position between the locating collet 6 and the pushrod 3.

Figure 5:
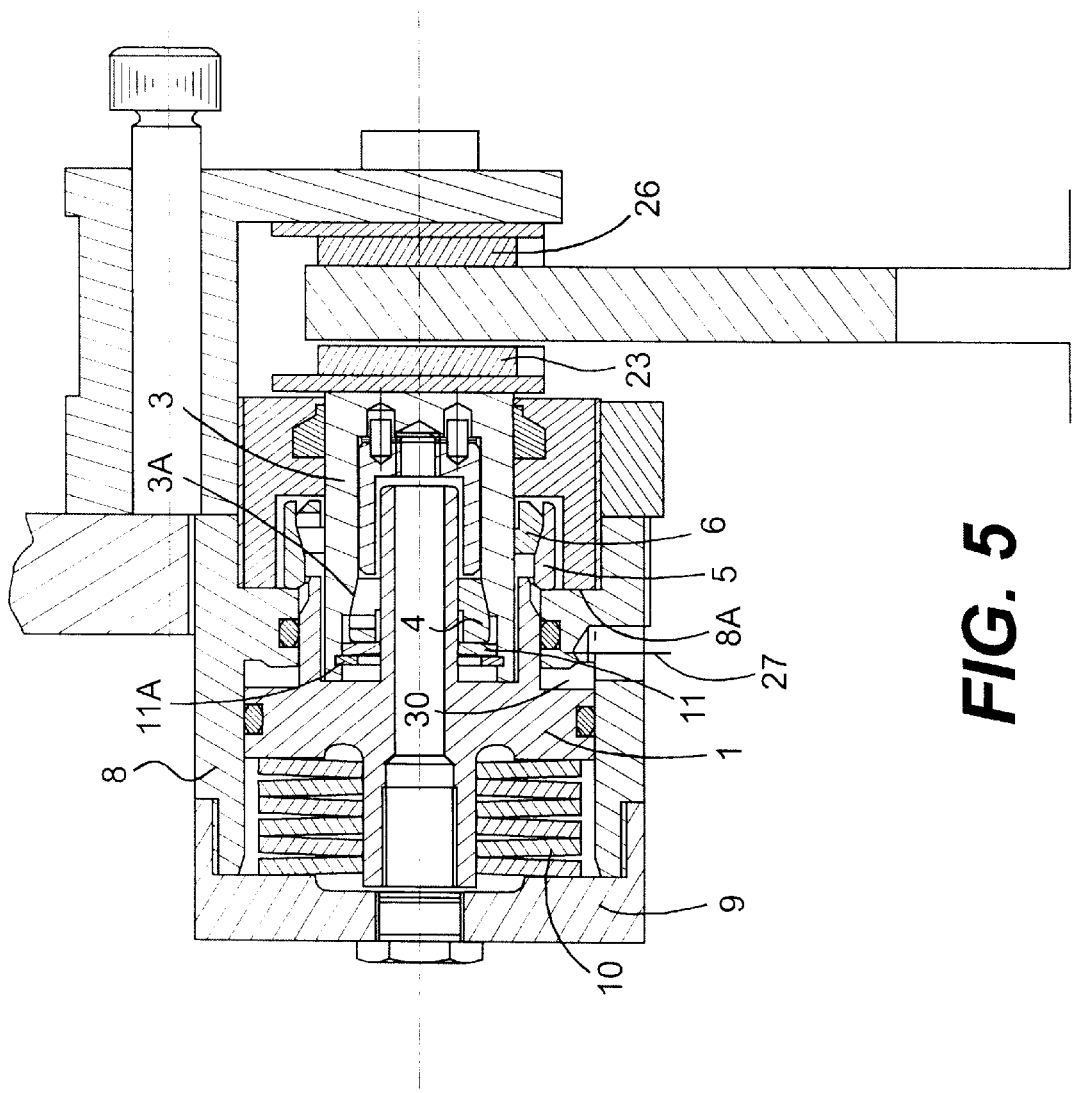
FIG. 5 is a similar drawing to FIG. 1 showing the brake released after brake application.

When the brake is then released by applying pressure through port 27 into cylindrical space 30 (FIG. 5), piston 1 is caused to move and compress spring pack 10. This movement of piston 1 (from right to left as seen in FIG. 5) draws the pushrod 3 back from right to left due to the clamp generated by the actuation collet 4 between cylindrical extension 1A of piston 1 and the inner conical surface 3A of pushrod 3. The location collet 6 is also drawn back with pushrod 3 until it contacts the locating collar 5 and then both are drawn back together.

When the locating collar 5 contacts shoulder 8A in piston housing 8, the movement of pushrod 3 is stopped by the clamp of the locating collet 6. At this point the actuation collet 4 is disengaged by being pulled back against a spring 11 located within pushrod 3 by circlip 11A. This allows the piston 1 to move relative to the actuation collet 4 and thus adjust for any extra travel due to wear in the pads 23 and 26. The -adjustment in this manner is continuous and is controllable within high degrees of accuracy without any steps. The piston 1 continues to move back until it is stopped by end cap 9 as previously described.

Figure 7:
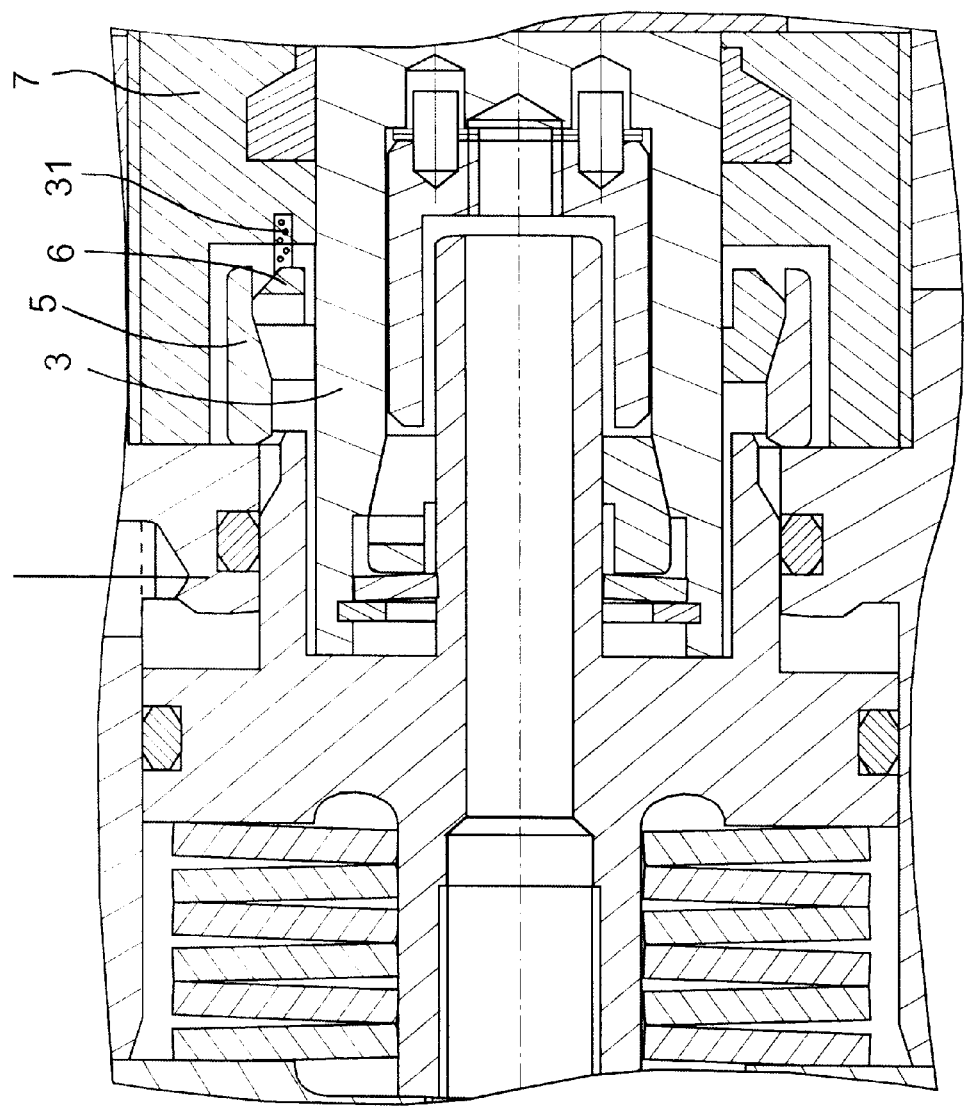
FIG. 7 is a similar drawing to FIG. 1 to an enlarged scale showing the use of a return spring in the lock actuator mechanism.

As an optional but preferred feature, the lock actuator mechanism between the pushrod 3 and the housing 7 is provided with a spring 31 (FIG. 7) contained within an annular recess in housing 7 as shown. The spring 31 impinges on the lock actuator locating collet 6 to give a positive predetermined retraction of the pushrod 3. The retraction ensures that the pushrod is withdrawn a positive distance to prevent the brake remaining partially applied and dragging.

The invention also incorporates a mechanism enabling the brake pads to be replaced as will be described with reference to FIG. 6.

To replace the brake pads, pressure is applied to piston 1 through port 27, compressing the spring pack 10 and retracting the pushrod 3 away from the brake pad 23. The brake pads 23 and 26 are then removed and pressure released from port 27 allowing piston 1 to travel from left to right as seen in FIG. 6 until it contacts shoulder 8B of piston housing 8.

Figure 6:
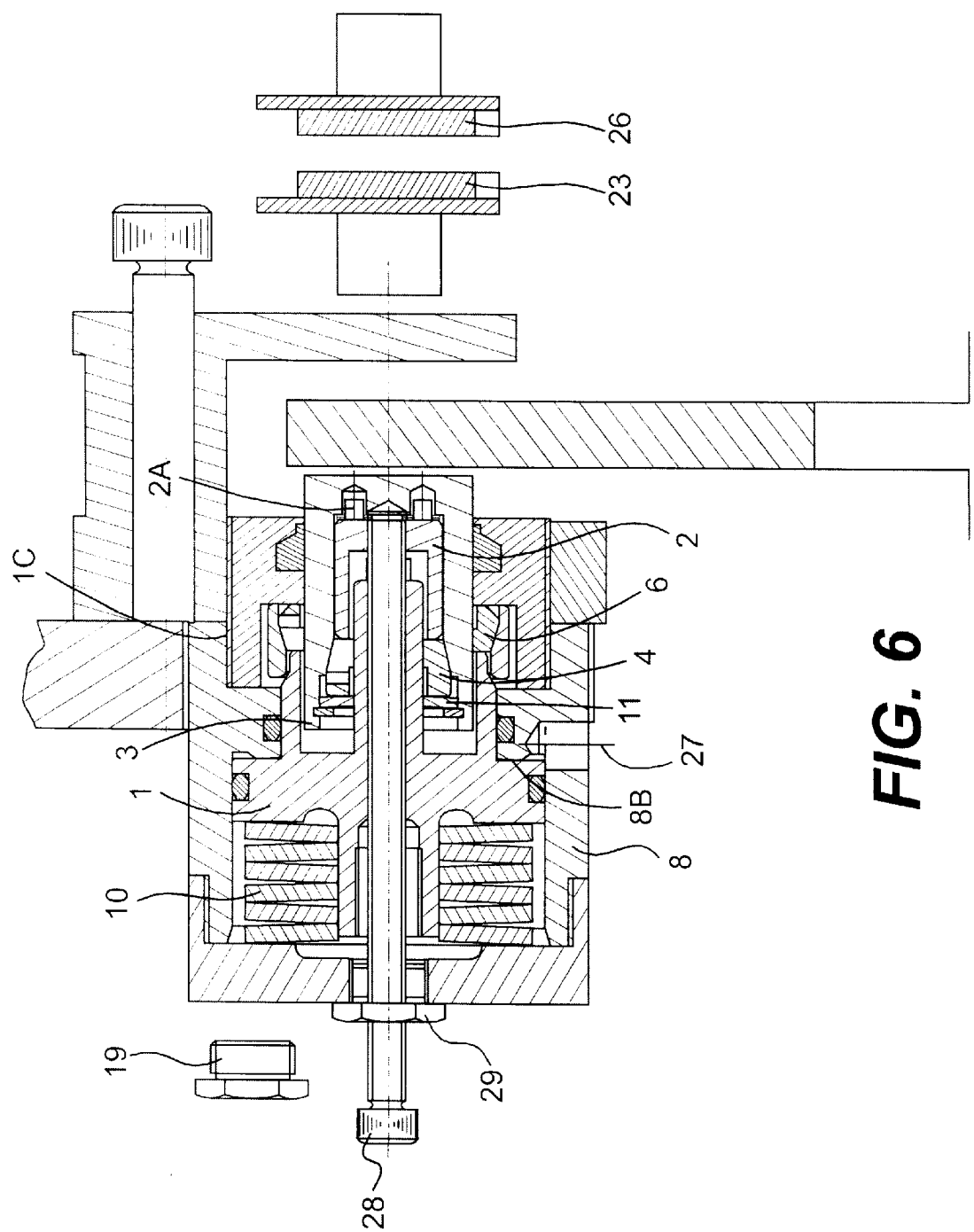
FIG. 6 is a similar drawing to FIG. 1 showing the use of a retracting bolt for changing the brake pads in the mechanism according to the invention.

Piston 1 is provided with a further annular extension 1C which pushes against locating collet 6 as seen in FIG. 6 releasing the clamp from the outer periphery of pushrod 3 and allowing the pushrod 3 to be moved back from left to End cap 9 is provided with a central breather plug 19 which is now removed and a retracting bolt 28 is inserted through the centre of piston 1 as shown and screwed into a release cup 2 located within the pushrod 3. Release cup 2 is restrained from rotating relative to pushrod 3 by locating dowels 2A which allow axial movement of the release cup relative to the pushrod without relative rotation. A release nut 29 is provided, threadedly engaged with retracting bolt 28. The release nut 29 is screwed down the retracting bolt 28 causing the bolt to withdraw from end cap 9 and further causing the release cup 2 engaged with the end of bolt 28 to be pushed back against the actuation collet 4. This movement of actuation collet 4 compresses actuation spring 11 releasing the clamp load on the actuation collet 4. As the release nut 29 continues to be screwed down, pushrod 3 is pulled back by the force acting through release cup 2, collet 4, spring 11 and circlip 11A, until it contacts piston 1. The release nut 29 is then unscrewed and the release bolt 28 removed.

Pressure is then applied through port 27 moving piston 1 back to compress the spring pack 10. A new set of brake pads 23 and 26 is then installed and the actuator is again ready for use.

In this manner an adjusting mechanism for a spring applied fail-safe brake is provided which operates automatically and constantly compensates for wear so that spring travel is kept to a minimum. The mechanism also reduces the risk factor of the brake not being correctly adjusted manually and therefore losing effectiveness.

The mechanism can be used both in conventional calliper-type disc brakes and also in multi-plate wet brakes. It may also be used in other industrial applications where a spring applied mechanism with constant force is required over a constantly moving distance.

Figure 8:
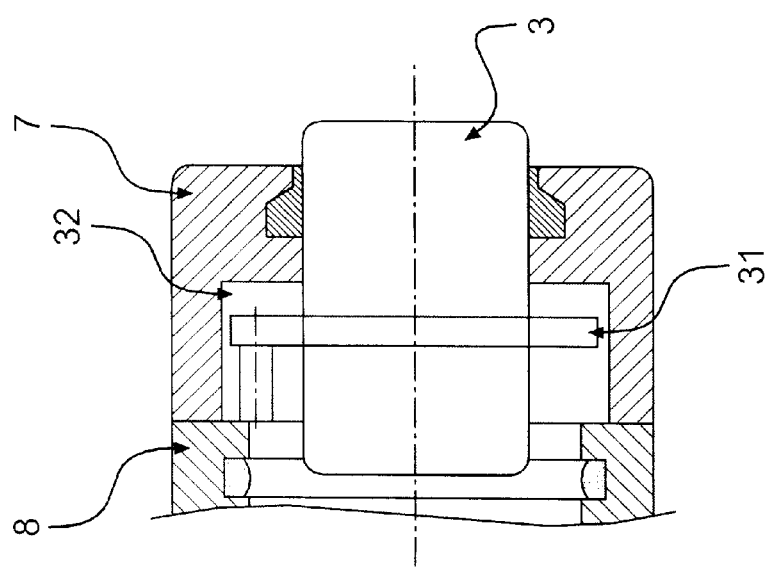
FIG. 8 is an alternative embodiment of the automatic adjuster using an offset collar mounted on the rod.

Although the lost travel adjustment mechanism has been described as being achieved by two collet mechanisms contained within the overall device, the adjustment can be achieved by other mechanisms. For example as shown in FIG. 8 a lock actuator 32 which transmits the force by locking an offset collar 31 on a rod, i.e., pushrod 3, (such as is well known and typified by the stop used on a screen door closer pushrod) can accomplish the same result as the collets.

The pushrod locking function can also be accomplished by a lock actuator, self-locking screw thread or any other form of known one-way locking device.

What is claimed is:

1. An automatic adjuster for spring applied mechanism of the type wherein travel of an actuating member under spring pressure may vary depending upon component wear, the automatic adjuster comprising:

a piston movable by force application from spring pressure in one direction to apply a desired force and by other actuating means in the opposite direction to remove the desired force;

a pushrod movable by and with the piston;

lock actuator operable between the piston and the pushrod arranged to provide positive movement of the pushrod with the piston in said one direction of force application from spring pressure while allowing relative movement between the piston and the pushrod during movement of the piston in the opposite direction; and a further lock actuator, including an offset collar mounted on, and offset with respect to said pushrod, operable to releasably engage or contact, and thus being operable between, the pushrod and a housing for the piston, respectively, the further lock actuator being arranged to control movement of the pushrod between predetermined limits during retraction of the pushrod.

2. An automatic adjuster as claimed in claim 1 wherein said piston includes an extension operable to disengage said further lock actuator and allow the pushrod to be retracted to an unadjusted position.

3. An automatic adjuster as claimed in claim 1 further comprising a release cup operable from outside the adjuster to release the lock actuator from forming a clamp between the piston and the pushrod.

4. An automatic adjuster as claimed in claim 1 wherein the pushrod is arranged to actuate the clamping motion of a pair of disc pads in a disc brake.

5. An automatic adjuster as claimed in claim 3 wherein the pushrod is arranged to actuate the clamping motion of a pair of disc pads in a disc brake.

6. An automatic adjuster as claimed in claim 5 wherein the release cup is operable to enable retraction of the pushrod for pad replacement in the disc brake.

* * * * *